United States Patent
Fenton

(10) Patent No.: US 7,278,597 B2
(45) Date of Patent: Oct. 9, 2007

(54) ROTATING CYLINDRICAL FLAILING VEGETATION CUTTER

(76) Inventor: Barry David Fenton, Box 32, Site 1, RR.3, Grande Prairie, Alberta (CA) T8V 5N3

( * ) Notice: Subject to any disclaimer, the term of this patent is extended or adjusted under 35 U.S.C. 154(b) by 0 days.

(21) Appl. No.: 11/107,445

(22) Filed: Apr. 15, 2005

(65) Prior Publication Data

US 2006/0230733 A1 Oct. 19, 2006

(30) Foreign Application Priority Data

Jan. 19, 2005 (CA) .................................... 2493348

(51) Int. Cl.
B02C 13/00 (2006.01)

(52) U.S. Cl. ................................................. 241/194

(58) Field of Classification Search ............... 56/16.7, 56/16.4 A, 16.4 R, 294, 504; 241/55, 194, 241/195, 197, 191; 460/112, 901; 172/545, 172/28

See application file for complete search history.

(56) References Cited

U.S. PATENT DOCUMENTS

| | | | |
|---|---|---|---|
| 502,301 A | 8/1893 | Kime | |
| 1,196,954 A | 9/1916 | Huebsch | |
| 1,362,409 A | 12/1920 | Forker | |
| 1,802,711 A | 4/1931 | Fitts | |
| 2,886,117 A * | 5/1959 | Benson .................... | 172/545 |
| 4,077,573 A * | 3/1978 | Kersey et al. .............. | 241/32 |
| 4,259,834 A | 4/1981 | Lambert et al. | |
| 4,611,669 A | 9/1986 | Ballard | |
| 4,619,061 A * | 10/1986 | Swanson ..................... | 37/248 |
| 4,706,761 A | 11/1987 | Herscher et al. | |
| 4,973,005 A | 11/1990 | Haesebrouck | |
| 5,003,759 A | 4/1991 | Brown | |
| 5,131,217 A | 7/1992 | Convine | |
| 5,240,190 A * | 8/1993 | Johnson ..................... | 241/74 |
| 5,480,351 A * | 1/1996 | Coleman .................... | 460/72 |
| 5,485,718 A | 1/1996 | Dallman | |
| 5,570,571 A | 11/1996 | Dallman | |
| 5,605,291 A * | 2/1997 | Doskocil .................... | 241/55 |
| 5,848,627 A | 12/1998 | Brown | |
| 6,000,205 A | 12/1999 | Joray | |
| 6,055,798 A | 5/2000 | Fulmer et al. | |
| 6,098,387 A * | 8/2000 | Pfisterer ................. | 56/16.4 R |
| 6,227,469 B1 * | 5/2001 | Daniels et al. .............. | 3/186.3 |
| 6,484,811 B1 | 11/2002 | Edwards | |
| 6,802,176 B2 | 10/2004 | Gaudreault | |
| 6,945,025 B2 * | 9/2005 | Morency et al. ............. | 56/504 |

* cited by examiner

*Primary Examiner*—Árpád Fábián Kovács
(74) *Attorney, Agent, or Firm*—Davis Bujold & Daniels, P.L.L.C.

(57) ABSTRACT

A rotating cylindrical flailing vegetation cutter, which includes a power rotated shaft having a cross-sectional profile. Disks are provided having a central aperture adapted to slide over the shaft and non-rotatably engage the cross-sectional profile. Each of the disks remain separate from and unattached to the shaft. Spacers are secured between the disks to maintain relative lateral spacing of the disks and form a disk assembly. Flail members are carried by the disk assembly.

2 Claims, 4 Drawing Sheets

ROTATING CYLINDRICAL FLAILING VEGETATION CUTTER

This application claims priority from Canadian Application Serial No. (not yet known) filed Jan. 19, 2005.

FIELD OF THE INVENTION

The present invention relates to a rotating cylindrical structure that has flail members, which flail vegetation as the structure rotates.

BACKGROUND OF THE INVENTION

There are a number of existing patents relating to rotating cylindrical flailing vegetation cutters:

U.S. Pat. No. 4,259,834 (Lambert et al 1981) entitled "Synchronized flail for treatment of forestry residues";

U.S. Pat. No. 4,973,005 (Haesebrouck et al 1990) entitled "Hammer-crusher rotor".

U.S. Pat. No. 5,003,759 (Brown 1991) entitled "Brush Mower";

U.S. Pat. No. 5,485,718 (Dallman January 1996) entitled "Flail cutter and method of providing a flail cutter for a brush cutting machine";

U.S. Pat. No. 5,570,571 (Dallman November 1996) entitled "Blade for a flail type brush cutting machine";

U.S. Pat. No. 5,848,627 (Brown 1998) entitled "Rotor for land clearing device";

U.S. Pat. No. 6,000,205 (Joray 1999) entitled "Flail-type vegetation cutter";

U.S. Pat. No. 6,484,811 (Edwards 2002) entitled "Mulching unit for use in mulching apparatus"; and U.S. Pat. No. 6,802,176 (Gaudreault 2004) entitled "Cutter head assembly".

SUMMARY OF THE INVENTION

According to the present invention there is provided a rotating cylindrical flailing vegetation cutter, which includes a power rotated shaft having a cross-sectional profile. Disks are provided having a central aperture adapted to slide over the shaft and non-rotatably engage the cross-sectional profile. Each of the disks remain separate from and unattached to the shaft. Spacers are secured between the disks to maintain relative lateral spacing of the disks and form a disk assembly. Flail members are carried by the disk assembly.

The cylindrical structure described above is easier to fabricate, easier to service and avoids a number of drawbacks, which were inherent in prior art rotating cylinder flailing vegetation cutters.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
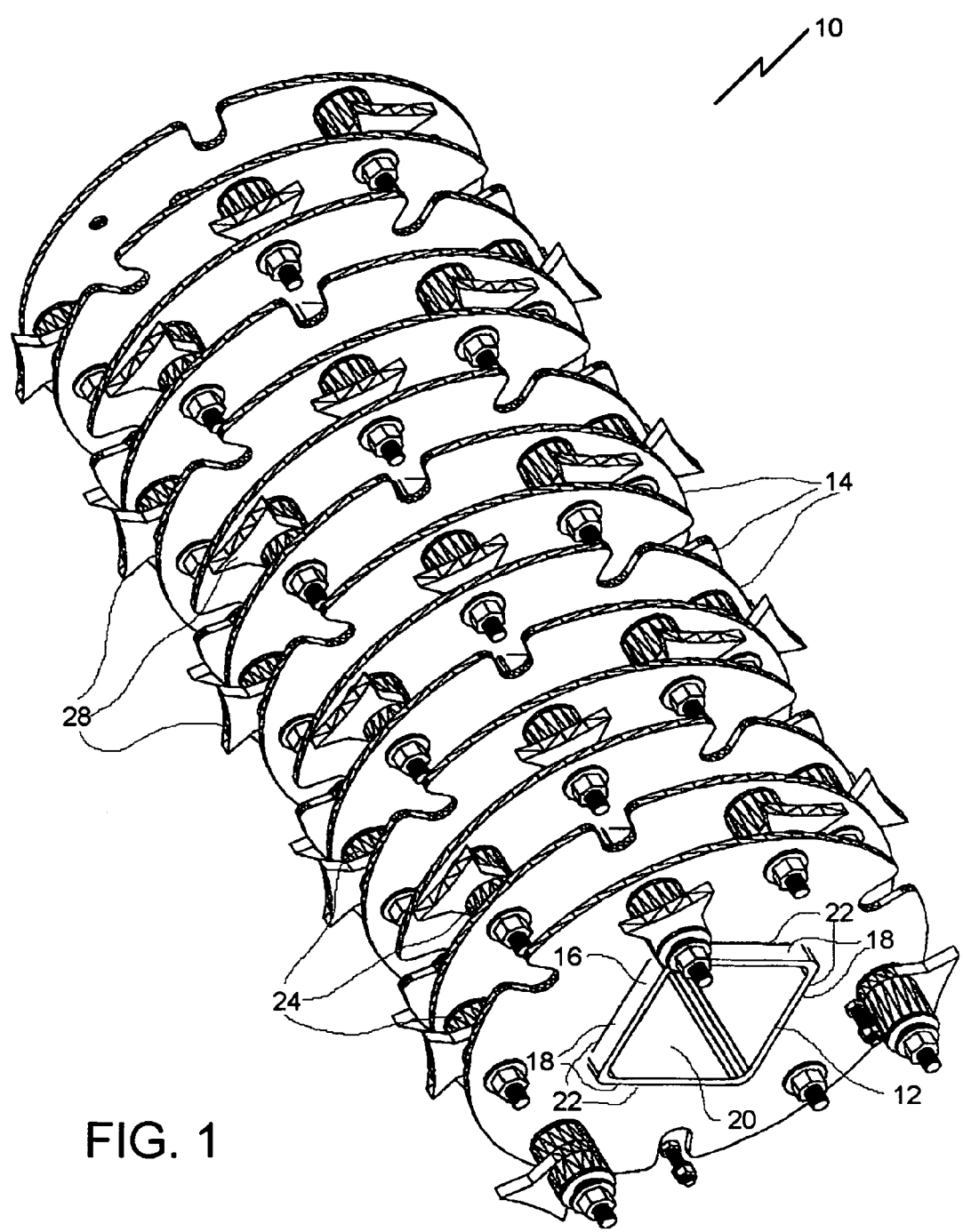
FIG. 1 is a perspective view of a rotating cylindrical flailing vegetation cutter constructed in accordance with the teachings of the present invention.

The preferred embodiment, a rotating cylindrical flailing vegetation cutter generally identified by reference numeral 10, will now be described with reference to FIG. 1 through FIG. 4.

Figure 2:
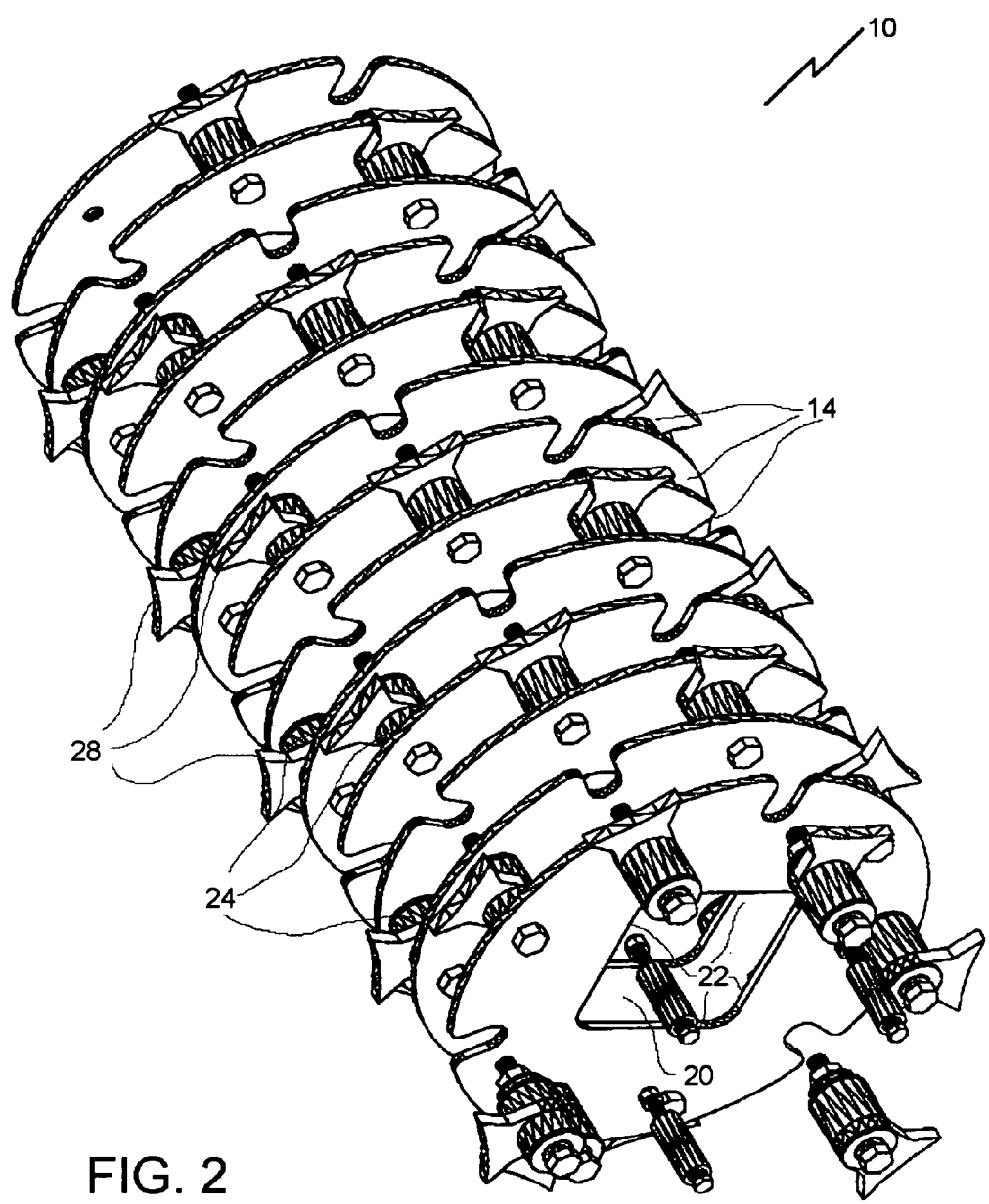
FIG. 2 is a perspective view of a disk assembly from the rotating cylindrical flailing vegetation cutter illustrated in FIG. 1.

Structure and Relationship of Parts:

Referring to FIG. 1, there is illustrated a rotating cylindrical vegetation cutter 10 having a power rotated shaft 12 with a plurality of disks 14 mounted on shaft 12. Shaft 12 has a square cross-sectional profile, which provides an exterior surface 16 having four connected engagement surfaces 18. Each of disks 14 has a central aperture 20 adapted to slide over shaft 12 and non-rotatably engage the four engagement surface 18 provided by the square cross-sectional profile. It can be seen that in this embodiment of the invention, central aperture 20 is also square and has four engagement surfaces 22, which match the four engagement surfaces 18 on shaft 12. It is important for the functioning of the present invention that each of disks 14 remain separate from and physically unattached to shaft 12. The prior art also had a shaft 12 and disks 14, but the disks 14 were welded to shaft 12. Since disks 14 are not welded onto shaft 12, some means must be provided to maintain a desired lateral spacing. Spacers 24 are secured between disks 14 to maintain relative lateral spacing of disks 14. Referring to FIG. 2, when spacers 24 are secured between disks 14, a disk assembly, generally indicated by reference numeral 26, is formed. FIG. 2 shows disk assembly 26, as it would appear removed from shaft 12. Flail members 28 are carried by disk assembly 26. As is known in the art, flail members 28 are circumferentially and laterally spaced around disk assembly 26 in a manner which maintains a balanced assembly while providing aggressive cutting action.

Figure 3:
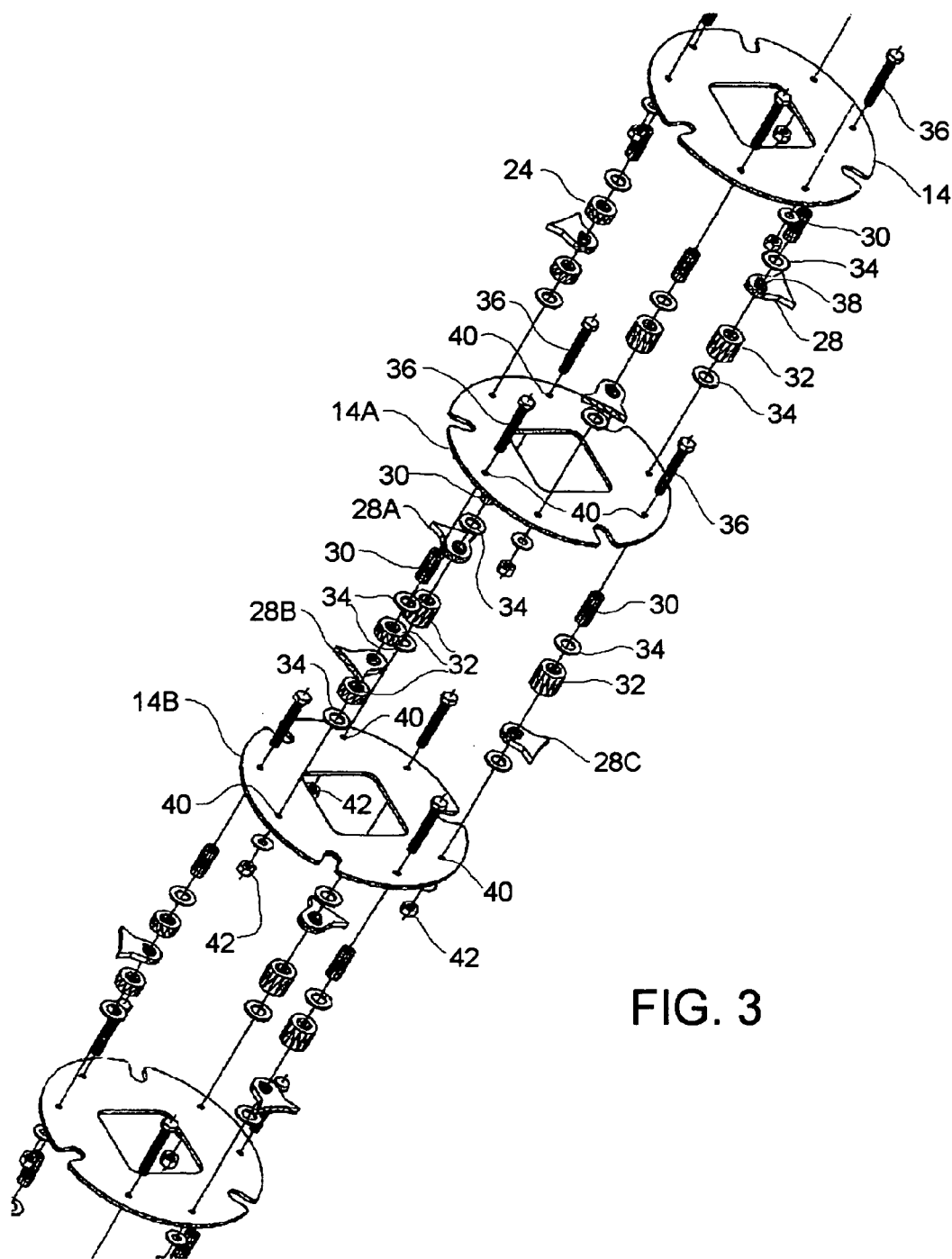
FIG. 3 is a detailed exploded perspective view of the disk assembly illustrated in FIG. 2.

Referring to FIG. 3, the structure of a preferred form of spacer 24 is shown. Spacer 24 has inner sleeves 30, outer sleeves 32, and washers 34. During assembly, bolts 36 are extended through apertures in disks 14 and through inner sleeves 30. Each of flail members 28 has a central aperture 38. Inner sleeve 30 is inserted into central aperture 38 and flail members 28 are slid over inner sleeve 30. In order to maintain a desired lateral spacing of flail members 28 on inner sleeve 30, outer sleeves 32 are also positioned over inner sleeve 30. In this way the lateral movement of each flail member 28 is limited by the positioning of outer sleeve 32. It is preferred that flail members 28 circumferentially spaced around and between each pair of disks be laterally offset. To illustrate this point, a pair of adjacent disks 14 have been more specifically identified as disks 14a and 14b. Three flail members 28 have been more specifically identified as flail members 28a, 28b and 28c. With flail member 28a, a single long outer sleeve 32 has been used to laterally position flail member 28a next to disk 14a. With flail member 28b, two relatively short outer sleeves 32 have been placed on either side of flail member 28b to position flail member 28b equidistant between disks 14a and 14b. With flail member 28c, another single long outer sleeve 32 has been used to laterally position flail member 28c next to disk 14b. Washers 34 are placed over inner sleeve 30 and serve as a bearing surface which prevents wear on disks 14 by either flail members 28 or outer sleeves 32. It will be understood that during assembly bolts are first inserted through apertures 40 in disks 14, (in this case 14*b*) and after assembly of spacer 24 with flail member 28 is inserted through aperture 40 in adjacent disk (in this case 14*a*) and are secured in position by nuts 42.

Figure 4:
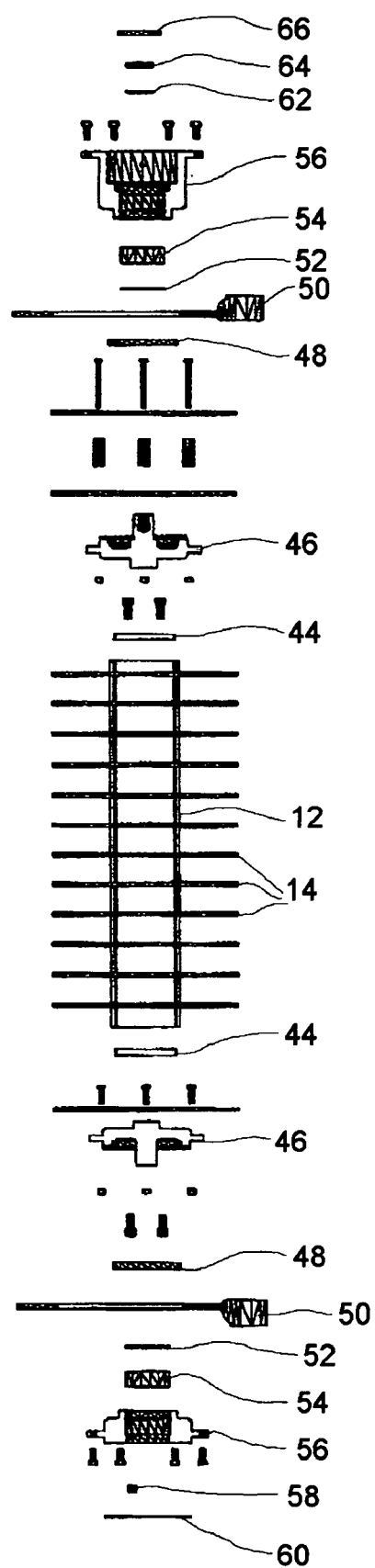
FIG. 4 is a top plan view of the rotating cylindrical flailing vegetation cutter illustrated in FIG. 1, with bearings and mounting hardware.

Referring to FIG. 4, there is illustrated mounting details for rotating cylindrical vegetation cutter 10. In addition to shaft 12 and disks 14, there is illustrated all of the bearings, spindles, etc. that are used during a typical installation. These components will be described in order outwardly from shaft 12. As the form of shaft 12, which has been used, is tubular, end caps 44 are used to close each end of shaft 12. Spindles 46 are positioned at each end of shaft 12. Seal rings 48 are positioned after spindles 46. Frame supports 50 are positioned after seal rings 48. Snap rings 52, bearings 54 and bearing housings 56 are positioned after frame supports 50. Snap rings 52 secure bearings 54 in position within bearing housings 56. Shown only at one end of the assembly is a grease nipple plug 58, which fits into one of bearing housings 56. It will be understood that both bearing housings 56 will, preferably, have provision for the insertion of lubricants. One end of the assembly terminates in a cover plate 60. A lock washer 62 and lock nut 64 are used to secure spindle 46 to bearing housing 56 at the other end of the assembly. The other end of the assembly terminates in a motor pilot ring 66.

Operation:

Once assembly, the operation of rotating cylindrical vegetation cutter 10 does not differ in any material way from existing devices. Shaft 12 is rotated at approximately 1000 to 2000 rotations per minute (rpm). As shaft 12 rotates, engagement surfaces 18 provided by the square cross-sectional profile engages engagement surfaces 22 provided by square central aperture 20. This causes entire disk assembly 26 to rotate with shaft 12. Flail members 28 carried by disk assembly 26 provide aggressive cutting action.

The real advantages provided by rotating cylindrical vegetation cutter 10 are realized during assembly and during any repair. In the prior art, disks 14 were welded onto shaft 12. This made assembly and fabrication more onerous. It created problems relating to balance and welding stress. It limited that ability to service and maintain rotating cylindrical vegetation cutter 10, especially on site repairs at remote locations.

Variations:

In the preferred embodiment, shaft 12 is shown as being square. That is only because square tubing is comparatively inexpensive and is readily available. It will be appreciated that shaft could be virtually any polygonal in cross-section. There is no reason why a triangular cross section providing an exterior surface with three connected engagement surfaces would not work. There is no reason why five, six, seven, eight or even more engagement surfaces would not work. A circular shaft could be modified to work if flat engagement surfaces were ground on its exterior surface. All that is required is a locking engagement between the exterior of the shaft and the central aperture of the disks, that causes the disk assembly to rotate with the shaft.

Cautionary Warnings:

The balancing of disk assembly so that it rotates concentrically is important. An eccentric mounting causes undue vibration and leads to premature wear. The positioning of the flail cutters affects both balance and the cutting pattern. Both aspects must be fully considered when determining where to position the flail cutters.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. An apparatus comprising:
   a power rotated shaft having a polygonal cross-sectional profile with an exterior surface having at least three connected engagement surfaces;
   disks laterally spaced along the shaft and having a central aperture adapted to slide over the shaft and non-rotatably engage the cross-sectional profile, the central aperture being polygonal with an equal number of matching engagement surfaces, each of the disks remaining separate from and unattached to the shaft;
   spacers secured between the disks to maintain relative lateral spacing of the disks and form a disk assembly, the spacers being in the form of spacer sleeves spaced radially in relation to the shaft and overlying bolts, and the bolts coupling each of the disks with an adjacent disk to form disk pairings; and
   at least three pivotally mounted flail members circumferentially and laterally spaced in relation to each disk of the disk assembly, each of the at least three flail members having a mounting aperture, the mounting aperture overlying one of the bolts, each of the flail members being maintained in a desired lateral spacing on the one of the bolts by at least one of the spacer sleeves, and the flail members positioned between each of the disk pairings being laterally offset from the flail members positioned between an adjacent one of the disk pairings.

2. The apparatus as defined in claim 1, wherein the shaft is square in cross-section and has four connected engagement surfaces.

* * * * *